United States Patent [19]
Taka et al.

[11] Patent Number: 5,400,111
[45] Date of Patent: Mar. 21, 1995

[54] DISTANCE MEASUREMENT DEVICE HAVING A MODE FOR MEASURING AN EXTREMELY NEAR DISTANCE

[75] Inventors: Hideo Taka; Kazuyuki Maeda, both of Yokohama, Japan

[73] Assignee: Canon Kabushiki Kaisha, Tokyo, Japan

[21] Appl. No.: 230,014

[22] Filed: Apr. 19, 1994

Related U.S. Application Data

[63] Continuation of Ser. No. 916,622, Jul. 22, 1992, abandoned.

[30] Foreign Application Priority Data

Jul. 26, 1991 [JP] Japan .................................. 3-187643

[51] Int. Cl.6 .......................... G03B 13/36; G01C 3/00
[52] U.S. Cl. ..................................... 354/403; 356/3.11
[58] Field of Search ...................... 354/400, 403; 356/1

[56] References Cited

U.S. PATENT DOCUMENTS

| | | | |
|---|---|---|---|
| 4,908,648 | 3/1990 | Sawabe et al. | 354/403 |
| 4,943,824 | 7/1990 | Nabeshima et al. | 354/403 X |
| 4,947,202 | 8/1990 | Kitajima et al. | 354/403 |
| 4,983,033 | 1/1991 | Suzuki | 354/403 X |
| 5,006,700 | 4/1991 | Kosaka et al. | 354/403 X |
| 5,051,766 | 9/1991 | Nonaka et al. | 354/403 X |
| 5,223,885 | 6/1993 | Nakajima | 354/403 |

FOREIGN PATENT DOCUMENTS

| | | |
|---|---|---|
| 0103701 | 3/1984 | European Pat. Off. |
| 3416072 | 11/1984 | Germany |
| 60-19116 | 1/1985 | Japan |
| 2222336 | 2/1990 | United Kingdom |

*Primary Examiner*—Michael L. Gellner
*Assistant Examiner*—Jae N. Noh
*Attorney, Agent, or Firm*—Fitzpatrick, Cella, Harper & Scinto

[57] ABSTRACT

A distance measurement device includes a light projection unit for projecting light towards plural objects in different areas of a scene to measure respective distances to the objects. A photo-sensing unit receives reflected light from the different areas of the scene. Also provided is a processing unit which has a first mode and a second mode. The first mode is for measuring the respective distances to the objects based on a first photo-sense output of the photo-sensing unit corresponding to light projected to the different areas of the scene and reflected by the objects. The second mode is for judging, based on a second photo-sense output of the photo-sensing unit corresponding to light projected to a specific area and reflected by at least one of the objects, whether the at least one object is located outside of a distance measuring area within which a distance to the at least one object can be measured using the first mode. A selecting unit selects one of the first and second modes such that the first and second modes operate independently of each other.

14 Claims, 6 Drawing Sheets

DISTANCE MEASUREMENT DEVICE HAVING A MODE FOR MEASURING AN EXTREMELY NEAR DISTANCE

This application is a continuation of application Ser. No. 07/916,622, filed Jul. 22, 1992, now abandoned.

BACKGROUND OF THE INVENTION

1. Field of the Invention

The present invention relates to an active type distance measurement device for measuring distances to a plurality of distance measurement view fields to be used in a camera having an auto-focusing function.

2. Description of the Related Art

Referring to FIG. 8, in a prior art distance measurement device having a plurality of distance measurement view fields, light projected from a plurality of light emitting devices 1, 2 and 3 are projected to objects 5, 6 and 7 through a projection lens 4 and the lights reflected by the objects 5, 6 and 7 are focused on a plurality of two-split silicon photo-cells (SPC) through a focusing lens 8. Numeral 12 denotes a camera body which includes the distance measurement device. The two-split SPC's 9, 10 and 11 are formed by SPC's 9F, 10F and 11F which are closer to the light emitting devices and SPC's 9N, 10N and 11N on the opposite side, as shown in FIG. 9A, projection light images on the two-split SPC's when distances to the objects are 6 meters, 1.2 meters and 0.6 meter, respectively, are shown by 9B, 10B and 11B in FIG. 9B and 9C, 10C and 11C in FIG. 9C, and ratios of light images on 9F and 9N, 10F and 10N, and 11F and 11N are calculated to determine the distances to the objects 5, 6 and 7.

However, in the prior art camera, when the object is at an extremely near distance such as at approximately 0.2 meter, a center of gravity of the projected image is actually moved to a near end as shown by 10E in FIG. 10, but because of large defocusing of the image, a ratio of the incident lights to 10F and 10N on the two-split SPC 10 is apparently closer to the far end than that of the projected image 10D obtained when the distance is 0.6 meter, and an error in the distance measurement appears.

In a camera having one distance measurement view field rather than a plurality of distance measurement view fields, a sensor for measuring an extremely near distance may be separately provided. However, in the camera for measuring the distances to the plurality of view fields, there is no space to separately arrange a sensor for measuring the extremely near distance because the two-split SPC 11 is located adjacent to the two-split SPC 10. Even if there is a space, another sensor and an associated circuit are required in a large scale circuit required for the measurement of the distances to the plurality of view fields.

SUMMARY OF THE INVENTION

It is an object of the present invention to provide a distance measurement device which solves the problems encountered in the prior art and enables the measurement of an extremely near distance without requiring a separate optical system.

In accordance with the present invention, a means for selecting a combination other than a normal combination of light emitting/photo-sensing devices is provided in the distance measurement device having a plurality of distance measurement view fields. The combination of a plurality of light projection/sensing elements is selected such that an object at an extremely near distance is measured by the presence or absence of the sensed light outputs.

DETAILED DESCRIPTION OF THE PREFERRED EMBODIMENTS

Figure 1:
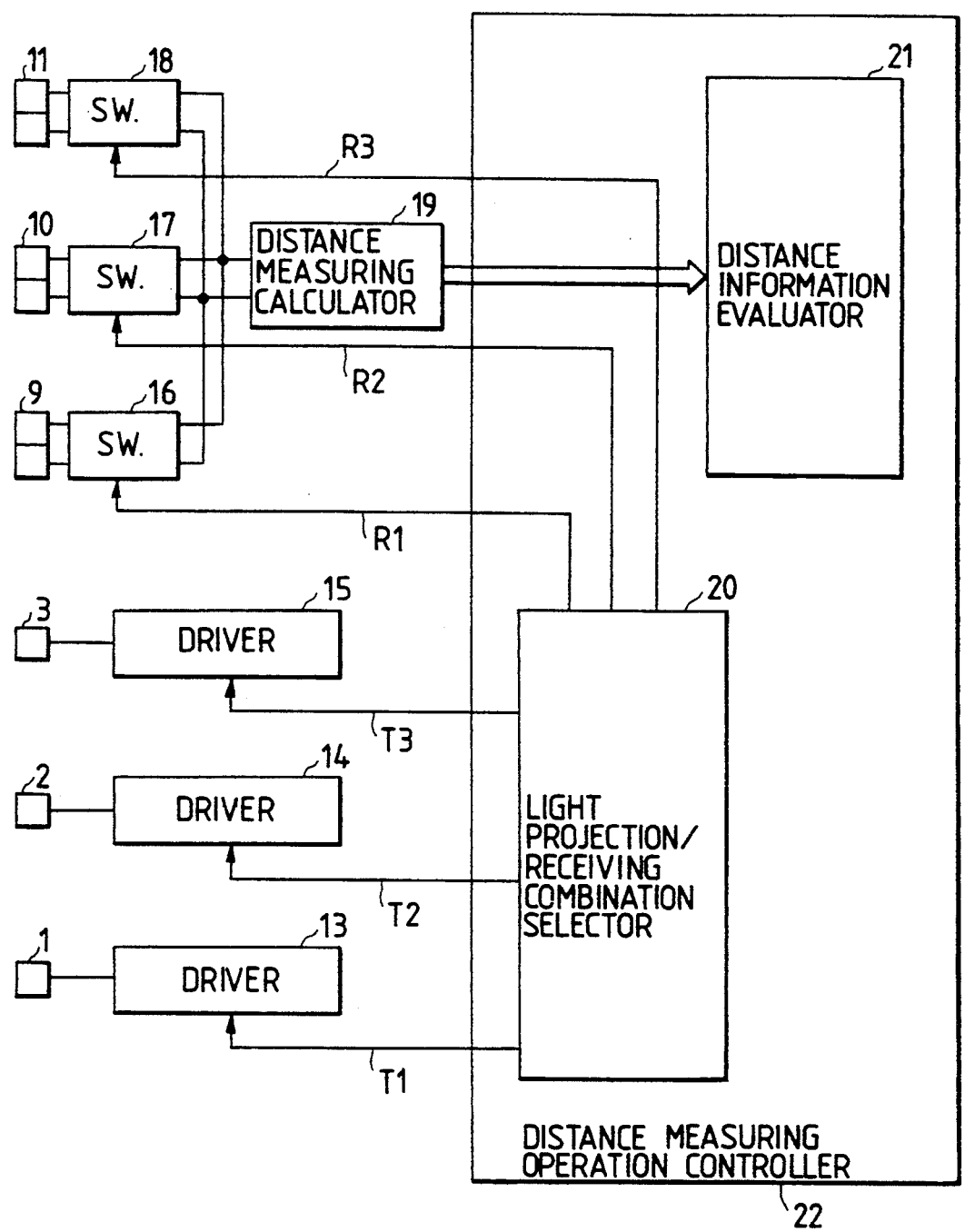
FIG. 1 shows a block diagram of a distance measurement device in accordance with the present invention.

FIG. 1 best illustrates a feature of the present invention. In FIG. 1, numerals 1, 2 and 3 denote light emitting devices such as infrared light emitting diodes, numerals 9, 10 and 11 denote photo-sensing devices such as two-split SPC's, numerals 13, 14 and 15 denote drive means controlled by control signals T1, T2 and T3 from distance measurement control means 22, to be described later, for causing the light emitting devices 1, 2 and 3 to emit lights. Numerals 16, 17 and 18 denote switching means controlled by control signals R1, R2 and R3 from the distance measurement control means 22 for switching the outputs of the photo-sensing devices 9, 10 and 11, numeral 19 denotes distance calculation means for producing distance information such as a magnitude of the photo-sensed output and a distance signal, numeral 20 denotes light emitting/photo-sensing device combination selection means which selects a combination of light emitting devices and the photo-sensing devices in accordance with a distance measurement sequence for producing the control signals T1, T2 and T3, and R1, R2 and R3, numeral 21 denotes distance information evaluation means which evaluates the distance information from the distance calculation means 19 in accordance with the distance measurement sequence to produce a distance measurement output, and numeral 22 denotes distance measurement control means including the light emitting/photo-sensing device combination selection means 20 and the distance information evaluation means 21 for controlling the distance measurement sequence.

Figure 2:
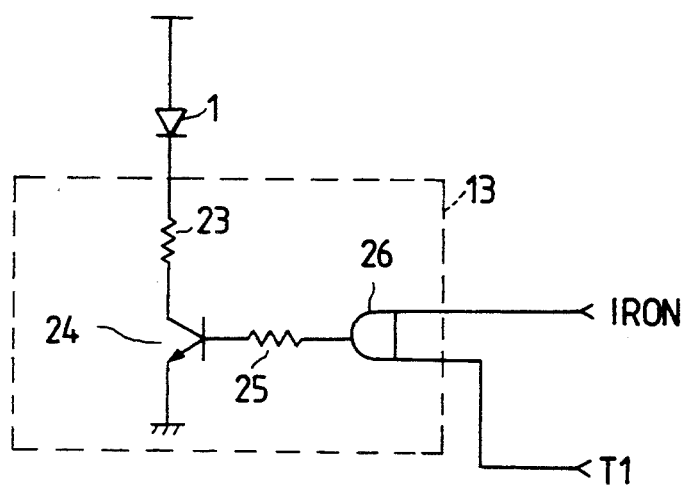
FIG. 2 shows a circuit diagram of the drive means of FIG. 1.

FIG. 2 shows a circuit diagram of the drive means 13 of FIG. 1. In FIG. 2, numeral 23 denotes a resistor for limiting a current, numeral 24 denotes a transistor for driving the light emitting device 1, numeral 25 denotes a resistor for limiting a current, and numeral 26 denotes an AND gate which receives the control signal T1 and a light emission timing signal IRON from a timing circuit (not shown) in the distance measurement control means 22. When the control signal T1 is at an H-level, the light emitting device 1 is caused to emit a light by the transistor 24 in accordance with the light emission timing signal IRON. Other drive means 14 and 15 are of the same configuration.

Figure 3:
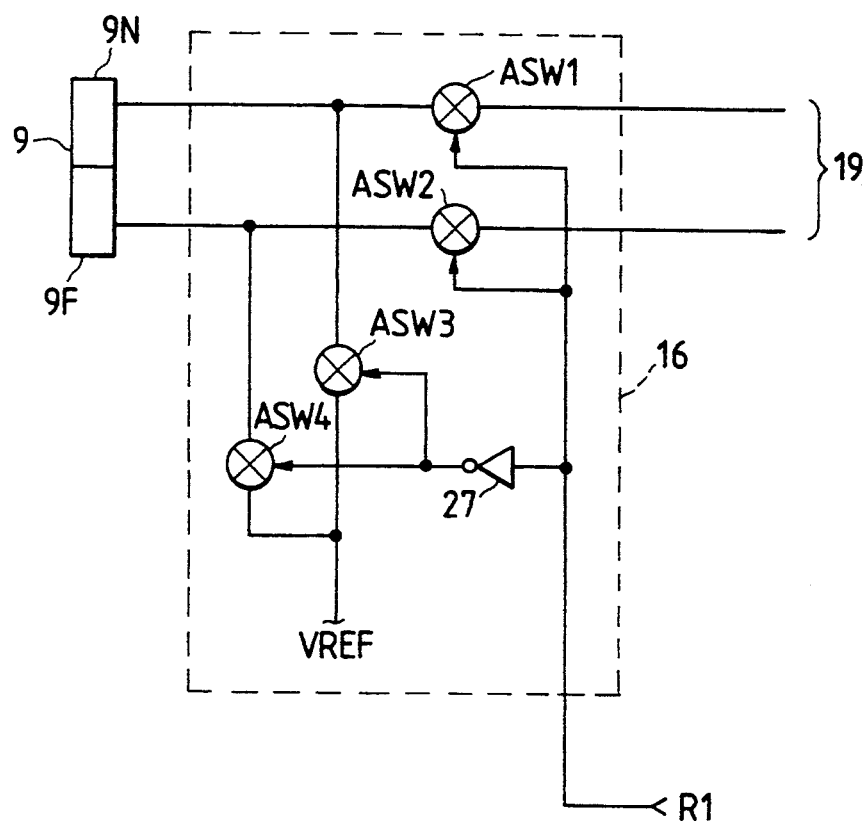
FIG. 3 shows a circuit diagram of the switching means of FIG. 1.

FIG. 3 shows a circuit diagram of the switching means 16 of FIG. 1. In FIG. 3, numeral 27 denotes an inverter which receives the control signal R1, and ASW1, ASW2, ASW3 and ASW4 denote analog switches. When the control signal R1 is at the H-level, the output of the inverter 27 is at an L-level so that the switches ASW1 and ASW2 are turned on and the switches ASW3 and ASW4 are turned off. Thus, the outputs 9F and 9N of the photo-sensing device 9 are supplied to the distance calculation means 19. When the control signal R1 is at the L-level, the output of the inverter 27 is at the H-level and the switches ASW1 and ASW2 are turned off while the switches ASW3 and ASW4 are turned on. Thus, the outputs 9F and 9N of the photo-sensing device 9 are connected to a reference voltage VREF.

Figure 4:
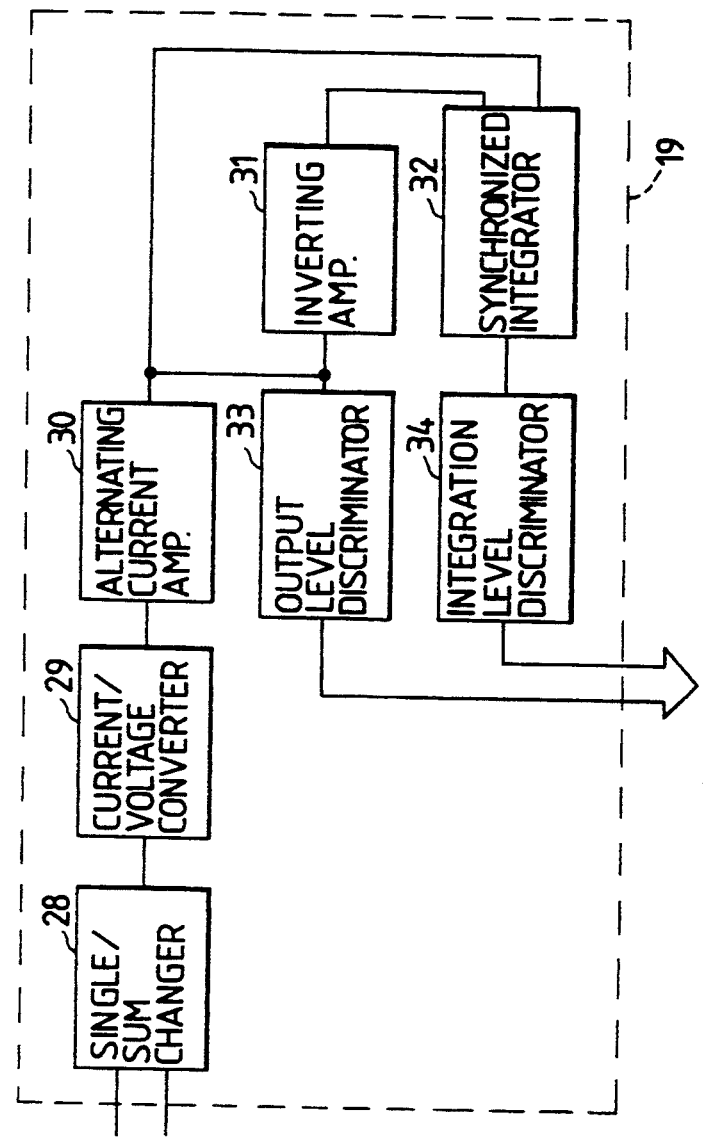
FIG. 4 shows a block diagram of the distance calculation means of FIG. 1.

FIG. 4 shows a block diagram of the distance calculation means 19 of FIG. 1. In FIG. 4, numeral 28 denotes single/sum selection means for selecting one or a sum of sensor outputs from the switching means 16, 17 and 18, numeral 29 denote current-voltage conversion means for converting an output current of the single/sum selection means 28 to a voltage, numeral 30 denotes an AC amplifier for amplifying an AC signal component due to flashing of the light emitting devices 1, 2 and 3 while blocking a DC component of the output of the current-voltage conversion means 29, numeral 31 denotes an inverting amplifier for inverting the output of the AC amplifier 30, numeral 32 denotes synchronous integration means for selectively integrating the outputs of the AC amplifier 30 and the inverting amplifier 31 in synchronism with the flashing of the light emitting devices 1, 2 and 3, numeral 33 denotes output level discrimination means for comparing the output of the AC amplifier 30 with a predetermined level and outputting a signal to the distance information evaluation means 21, and numeral 34 denotes integration level discrimination means for comparing the integration of the synchronous integration means 32 with a predetermined level and outputting a signal to the distance information evaluation means 21. The distance measurement by the single/sum selection means 28, the current-voltage conversion means 29, the AC amplifier 30, the inverting amplifier 31, and the synchronous integration means 32 is done in the manner described in Japanese Laid-Open Patent Application No. 60-19116.

Figure 5:
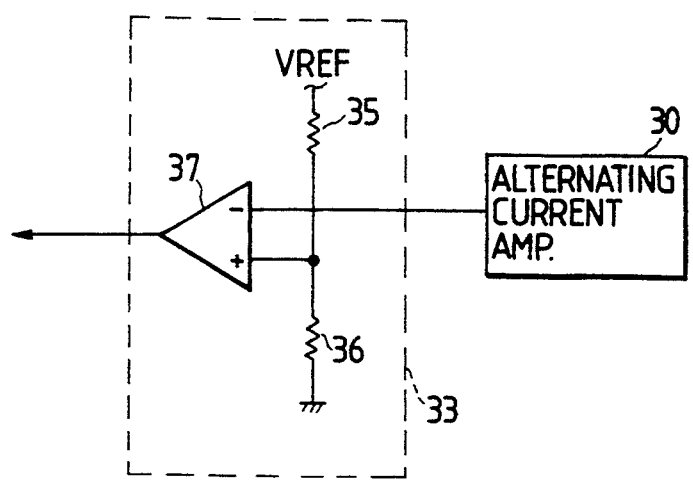
FIG. 5 shows a circuit diagram of the output level discrimination means of FIG. 4.

FIG. 5 shows a circuit diagram of the output level discrimination means 33 of FIG. 4. In FIG. 5, numerals 35 and 36 denote resistors for dividing the reference voltage VREF, and numeral 37 denotes a comparator for comparing the output of the AC amplifier 30 with the voltage divided by the resistors 35 and 36 and outputting a comparison result to the distance information evaluation means 21. When the photo-sensed output is large, the output of the comparator is at the H-level so that the gain of the AC amplifier 30 is reduced as required.

Figure 6:
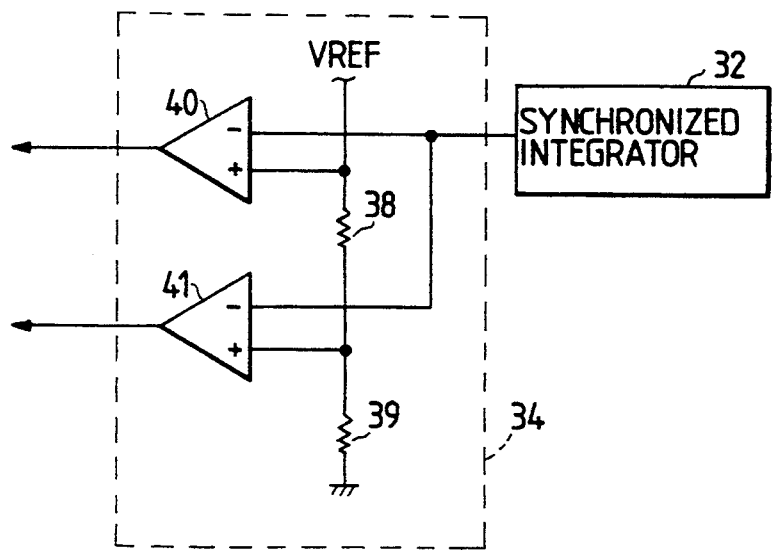
FIG. 6 shows a circuit diagram of the integration level discrimination means of FIG. 4.

FIG. 6 shows a circuit diagram of the integration level discrimination means 34 of FIG. 4. In FIG. 6, numerals 38 and 39 denote resistors for dividing the reference voltage VREF, numeral 40 denotes a comparator for comparing the output of the synchronous integration means 32 with the reference voltage VREF and outputting a comparison result to the distance information evaluation means 21, and numeral 41 denotes a comparator for comparing the output of the synchronous integration means 32 with the voltage divided by the resistors 38 and 39 outputting a comparison result to the distance information evaluation means 21. If the output of the comparator 41 is at the L-level after one of the sensed outputs has been integrated by the synchronous integration means 32 for a predetermined period, it means that the sensed output is low and the distance information evaluation means 21 receives no sensed output. When the output of the comparator 41 is at the H-level, the synchronous integration means reverse-integrates both sensed outputs, and when the integrated value exceeds the reference voltage VREF, the output of the comparator 40 changes from the H-level to the L-level. The distance information evaluation means 21 calculates the distance based on the time required for the level change.

Figure 7:
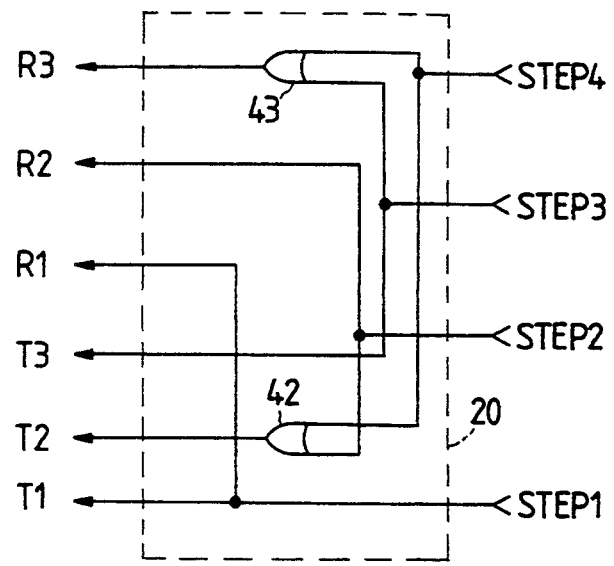
FIG. 7 shows a circuit diagram of the light emitting/photo-sensing device combination selection means of FIG. 1.
Figure 8:
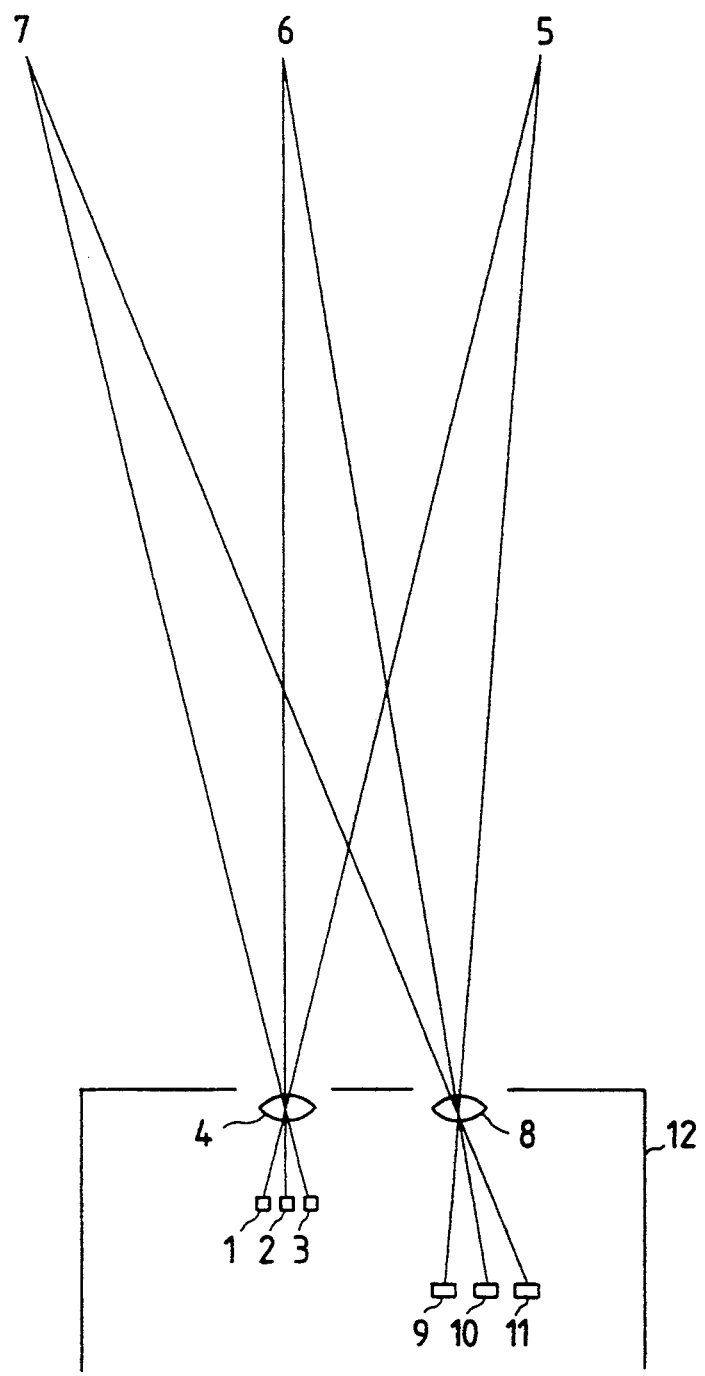
FIG. 8 shows light paths of a distance measurement device having a plurality of distance measurement view fields.

FIG. 7 shows a circuit diagram of the light emitting/photo-sensing device combination selection means 20 of FIG. 1. In FIG. 7, numerals 42 and 43 denote OR gates which (i) output the control signals T1 and R1 for selecting the combination of the light emitting device 1 and the photo-sensing device 9 by a signal STEP1 from a timing circuit (not shown) of the distance measurement control means 22, (ii) output the control signals T2 and R2 for selecting the combination of the light emitting device 2 and the photo-sensing device 10 through the OR gate 42 by a signal STEP2, (iii) output the control signals T3 and R3 for selecting the combination of the light emitting device 3 and the photo-sensing device 11 through the OR gate 43 by a signal STEP3, and (iv) output the control signals T2 and R3 for selecting the combination of the light emitting device 2 and the photo-sensing device 11 through the OR gates 42 and 43 by a signal STEP4.

In accordance with the above configuration, the distance information for the object in the normal distance range is produced in STEP1, STEP2 and STEP3 under the control of the distance measurement control means 22.

Figure 9A:
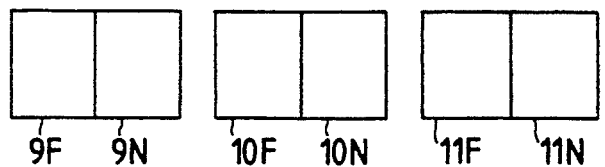
FIGS. 9A, 9B, 9C and 9D show projected images on photo-sensing devices on the plurality of distance measurement view fields.
Figure 9B:
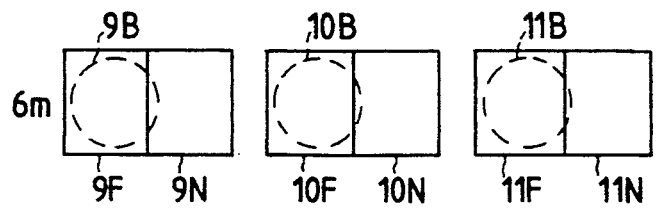
Figure 9C:
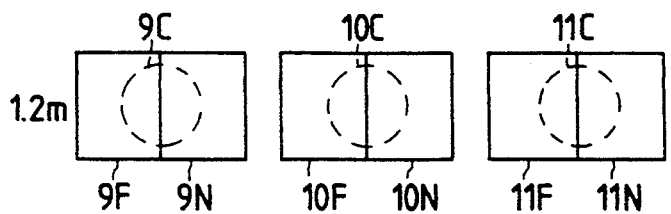
Figure 9D:
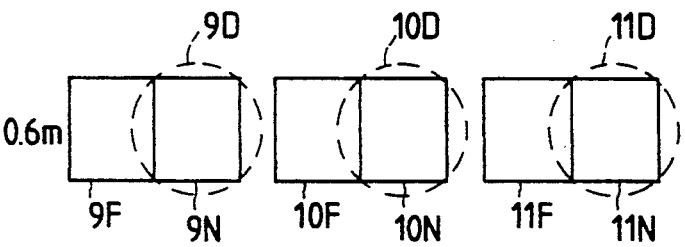
Figure 10:
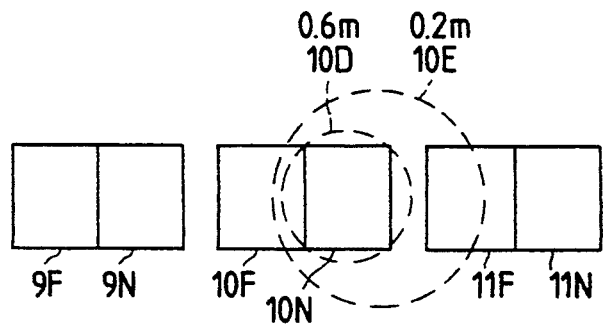
FIG. 10 shows a center projection image at a near distance.

On the other hand, in STEP4, the combination of the light emitting device 2 and the photo-sensing device 11 is selected. Thus, for the object which is in the normal distance range, there is no projected image from the light emitting device 2 on the photo-sensing device 11 as shown in FIGS. 9B, 9C and 9D and the output from the output level discrimination means 33 is at the L-level. However, when the object is at an extremely near distance, a portion of the projected image is on the photo-sensing device 11 as shown in FIG. 10 and the output of the output level discrimination means 33 is at the H-level because of a short distance. Thus, the distance information evaluation means 21 can discriminate whether the object is in the normal distance range or at the an extremely near distance by the output of the output level discrimination means 33 by using a combination other than the combination of the light emitting device and the photo-sensing device for the normal distance measurement view field.

While the input to the distance calculation means is switched in the above embodiment, separate distance calculation means may be provided for each photo-sensing device and the evaluation input to the distance information evaluation means may be switched.

While whether the object is at the extremely near distance or not is determined by the output of the output level discrimination means in the above embodiment, alternatively it may be determined by the output of the integration level discrimination means.

Further, while whether the object is at the extremely near distance or not is determined by the combination of the center light emitting device and the left (or right) photo-sensing device in the above embodiment, it may be determined by the combination of the right (or left) light emitting device and the center photo-sensing device.

In accordance with the present invention, an object at an extremely near distance can be detected by changing the combination of the light emitting devices and the photo-sensing device for the plurality of distance measurement view fields.

Instead of providing a plurality of light emitting devices, a single light emitting device may be provided and an optical system for splitting a light projection optical axis into a plurality of axes may be arranged in front of the light emitting device. The photo-sensing means may be a single device such as a PSD and an output thereof may be used to detect the photo-sense position. The two-split sensor may be substituted by a PSD.

What is claimed is:

1. A distance measurement device comprising:
   (a) light projection means for projecting light along a plurality of optical axes directions including a first optical axis direction and a second optical axis direction;
   (b) photo-sensing means sensitive to a plurality of photo-sensing regions including a first photo-sensing region and a second photo-sensing region;
   (c) processing means having a first mode and a second mode for measuring distances to objects in respective optical axes directions based on the output of said photo-sensing means which receives light that has been projected by said light projection means along respective optical axes directions and reflected from the objects in respective optical axes directions,
   wherein, in the first mode, said processing means measures the distance to the object in the first optical axis direction based on the output of said photo-sensing means corresponding to light projected by said light projection means along the first optical axis direction and reflected by the object in the first optical axis direction, and said processing means measures the distance to the object in the second optical axis direction based on the output of said photo-sensing means corresponding to light projected by said light projection means along the second optical axis direction and reflected by the object in the second optical axis direction,
   and wherein, in the second mode, said processing means judges whether or not a distance measurement operation for objects can be performed in the first mode based on an output of said photo-sensing means corresponding to the second photo-sensing region in response to light projected by said light projection means along the first optical axis direction and reflected by an object at a time when light is not projected by said light projection means along the second optical axis direction; and
   (d) selecting means for selecting between the first mode and the second mode independently of each other.

2. A distance measurement device according to claim 1, wherein said photo-sensing means comprises photo-sensing portions corresponding to respective photo-sensing regions.

3. A distance measurement device according to claim 1, wherein said processing means judges, in the second mode, whether the object from which the light is reflected is located nearer than a predetermined distance.

4. A distance measurement device according to claim 1, wherein said light projection means projects light, independently in a time-division manner, along respective optical axes directions.

5. A distance measurement device comprising:
   (a) light projection means for projecting light along a plurality of optical axes directions including a first optical axis direction and a second optical axis direction;
   (b) photo-sensing means sensitive to a plurality of photo-sensing regions corresponding to respective light projection optical axes directions including a first photo-sensing region corresponding to light projection along the first optical axis direction and a second photo-sensing region corresponding to light projection along the second optical axis direction;
   (c) processing means having a first mode and a second mode, wherein in the first mode, respective distances to objects in respective optical axes directions are measured by said processing means based on an output of said photo-sensing means which receives light that has been projected by said light projection means along respective optical axes directions and reflected by objects along the respective optical axes directions,
   and wherein in the second mode, it is judged whether or not a distance measurement operation can be performed in the first mode based on an output of said photo-sensing means corresponding to the second photo-sensing region in response to light projected by said light projection means along the first optical axis: direction and reflected by an object at a time when light is not projected by said light projection means along the second optical axis direction; and
   (d) selecting means for selecting between the first mode and the second mode independently of each other.

6. A distance measurement device according to claim 5, wherein said photo-sensing means comprises independent photo-sensing portions for each region.

7. A distance measurement device according to claim 6, wherein said light projection means projects light, independently in a time-division manner, along respective optical axes directions.

8. A distance measurement device according to claim 5, wherein said light projection means projects light, independently in a time-division manner, along respective optical axes directions.

9. A distance measurement device according to claim 8, wherein said light projection means inhibits light projection along the second optical axis direction when light projection along the first optical axis direction is performed in the second mode.

10. A distance measurement device according to claim 9, wherein said processing means judges, in the second mode, whether the object from which light is reflected is located nearer than a predetermined distance.

11. A distance measurement device according to claim 8, wherein said light projection means further comprises a plurality of light sources for projecting light along respective optical axes directions.

12. A distance measurement device according to claim 5, wherein said light projection means inhibits light projection along the second optical axis direction when light projection along the first optical axis direction is performed in the second mode.

13. A distance measurement device according to claim 12, wherein said light projection means further comprises a plurality of light sources for projecting light along respective optical axes directions.

14. A distance measurement device according to claim 5, wherein said processing means judges, in the second mode, whether the object from which light is reflected is located nearer than a predetermined distance.

* * * * *

UNITED STATES PATENT AND TRADEMARK OFFICE
CERTIFICATE OF CORRECTION

PATENT NO. : 5,400,111
DATED : March 21, 1995
INVENTOR(S) : HIDEO TAKA, ET AL.

It is certified that error appears in the above-indentified patent and that said Letters Patent is hereby corrected as shown below:

Column 3

Line 28, "denote" should read --denotes--.

Column 4

Line 59, "the" (first occurrence) should be deleted.

Column 6

Line 44, "axis:" should read --axis--.

Signed and Sealed this

Eleventh Day of July, 1995

BRUCE LEHMAN

Attest:

Attesting Officer

Commissioner of Patents and Trademarks